United States Patent
Roullet et al.

(10) Patent No.: US 8,265,082 B2
(45) Date of Patent: Sep. 11, 2012

(54) RELAY INCLUDING A MASS MEMORY FOR TEMPORARILY STORING DIFFERED-TIME INFORMATION STREAMS

(75) Inventors: Laurent Roullet, Toulouse (FR); Régis Lenormand, Blagnac (FR); Mickael Haddad, Toulouse (FR); Luc Delamotte, Toulouse (FR); Rémi Schneegans, Vannes (FR)

(73) Assignee: Alcatel Lucent, Paris (FR)

( * ) Notice: Subject to any disclaimer, the term of this patent is extended or adjusted under 35 U.S.C. 154(b) by 1687 days.

(21) Appl. No.: 10/043,326

(22) Filed: Jan. 14, 2002

(65) Prior Publication Data
US 2002/0093963 A1    Jul. 18, 2002

(30) Foreign Application Priority Data
Jan. 15, 2001    (FR) ..................... 01 00461

(51) Int. Cl.
*H04J 3/12* (2006.01)
*H04L 12/56* (2006.01)
*H04B 7/185* (2006.01)

(52) U.S. Cl. ............... 370/395.4; 370/232; 370/395.6; 370/412; 370/428; 370/475; 370/528

(58) Field of Classification Search .......... 370/216–528; 710/53
See application file for complete search history.

(56) References Cited

U.S. PATENT DOCUMENTS

| | | | |
|---|---|---|---|
| 5,315,586 A * | 5/1994 | Charvillat | 370/232 |
| 5,574,720 A | 11/1996 | Lee | |
| 5,999,534 A | 12/1999 | Kim | |
| 6,026,092 A | 2/2000 | Abu-Amara et al. | |
| 6,091,709 A | 7/2000 | Harrison et al. | |
| 6,393,000 B1 * | 5/2002 | Feldman | 370/316 |
| 6,459,681 B1 * | 10/2002 | Oliva | 370/232 |
| 6,529,971 B1 * | 3/2003 | Thiesfeld | 710/53 |
| 6,876,666 B1 * | 4/2005 | Engdahl | 370/466 |

* cited by examiner

*Primary Examiner* — Afsar M. Qureshi
(74) *Attorney, Agent, or Firm* — Sughrue Mion, PLLC

(57) ABSTRACT

A relay for use in telecommunications equipment, said relay comprising:
a receiver (R) adapted to receive an information stream consisting of information cells, some of which can be empty,
a mixer (M) adapted to detect the empty cells and replace them with waiting cells, and
a transmitter (E) adapted to transmit the cells to a receiver, which relay is characterized in that it further comprises a stream analyzer (A) for determining if an information stream is a real-time information stream or a differed-time information stream and for storing differed-time stream cells in a mass memory (MM), and in that said mixer is adapted to choose said waiting cells from among the cells stored in said mass memory.

12 Claims, 1 Drawing Sheet

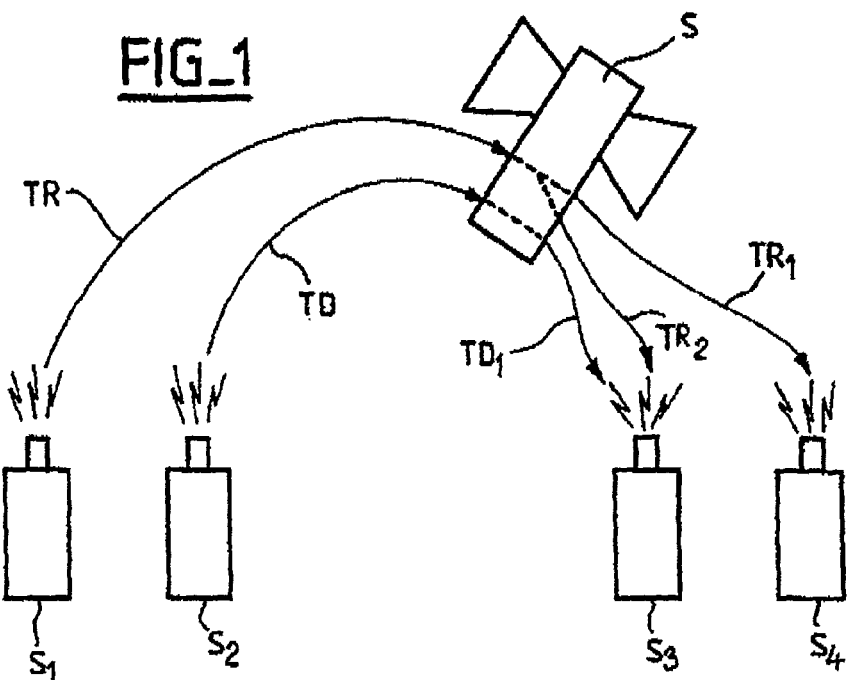
FIG_1
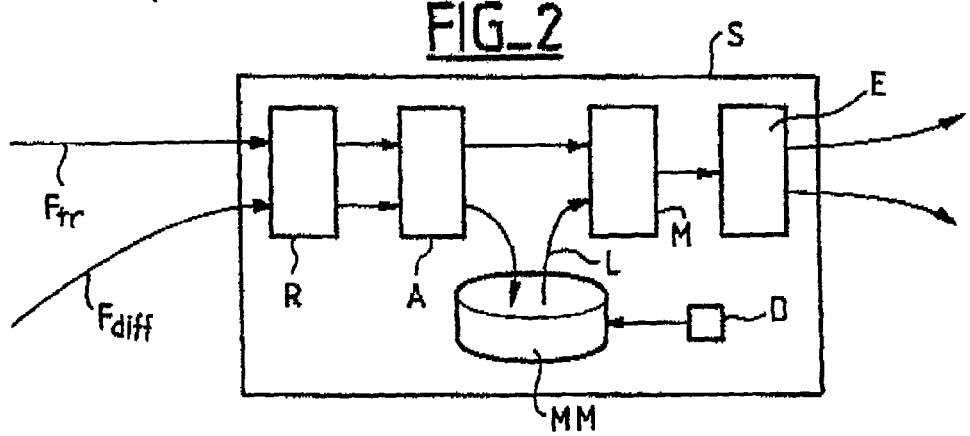
FIG_2
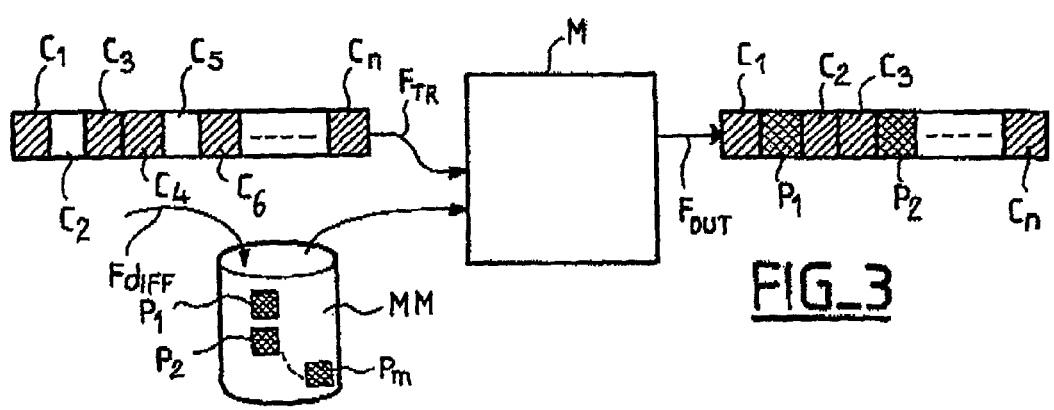
FIG_3

RELAY INCLUDING A MASS MEMORY FOR TEMPORARILY STORING DIFFERED-TIME INFORMATION STREAMS

BACKGROUND OF THE INVENTION

1. Field of the Invention

The present invention relates to a relay for use in telecommunications equipment. It applies with particular advantage to telecommunications satellites.

2. Description of the Related Art

Telecommunications satellites are increasingly used in increasingly large numbers to broadcast content to end users. The content can relate to broadcast television channels, for example, or to Internet sessions.

However, the invention also finds applications in other kinds of telecommunications equipment, in particular in ground equipment.

FIG. 1 shows the use of a telecommunications satellite. It shows four ground stations $S_1$, $S_2$, $S_3$ and $S_4$, i.e. telecommunications equipment providing a link between one or more telecommunications satellites and a terrestrial telecommunications network (not shown). The ground stations can transmit data to a telecommunications satellite S and can receive data from it.

The data is structured in the form of information cells that take various forms, depending on the communication protocols used. A set of information cells sent by a ground station to a telecommunications satellite forms an uplink information stream. Conversely, a set of information cells sent by a telecommunications satellite to a ground station forms a downlink information stream.

Communication channels carry the uplink and downlink information streams and can be set up at the request of a ground station at the same as determining an associated bandwidth, i.e. specifying the likely volume of the information streams carried by the communication channels.

FIG. 1 shows two uplink information streams TD and TR and three downlink information streams $TR_1$, $TR_2$ and $TD_1$.

Telecommunications satellites can also have an information stream duplication function. Thus the information stream TR is duplicated in the telecommunications satellite S and sent to the two ground stations $S_3$ and $S_4$ in the form of the two downlink information streams $TR_1$ and $TR_2$.

Two types of information stream pass through a telecommunications satellite: real-time information streams and differed-time information streams.

During an Internet session, multimedia information conforming to the hypertext transfer protocol (HTTP) is sent in real time, because the user wishes to experience the shortest possible time-delay between requesting a multimedia document and seeing it on the screen of their communication terminal. On the other hand, a film can be downloaded from a server to the user's terminal in differed time.

The uplink information stream TR and the downlink information streams $TR_1$ and $TR_2$ in FIG. 1 are real-time streams. The uplink information stream TD and the downlink information stream $TD_1$ are differed-time streams.

The bit rates of the information streams may vary. Consequently, to avoid congestion, the satellite and the communication channels are generally designed for the maximum possible bit rate, or the permitted number of users is defined relative to the bit rate needed to convey the information streams simultaneously in real time.

For example, a real-time information stream is generally associated with a bandwidth reserved at the same time as setting up the communication channel to carry the information stream. As already indicated, at any given time the bit rate of the real-time stream is not necessarily the same as the reserved bandwidth.

For example, the real-time stream may correspond to a television channel. Television transmissions are generally coded differently and with different qualities; for example, films are coded with high quality that can use the whole of the reserved bandwidth, whereas other transmissions, requiring lower quality, use only part of the reserved bandwidth.

In this case, the unused part is filled with cells known as "filler" cells so that this underuse is transparent for the various equipment units of the system.

Consequently, it is clear that the reserved bandwidth is in practice rarely used, with the result that a significant proportion of the capacity of the resources employed is underused.

Thus the problem arises of underuse of the capacity of the resources of the communication satellites, in particular underuse of the downlink channels.

A first solution is to use the asynchronous transfer mode (ATM) technology to improve the use of resources.

However, this kind of solution is not satisfactory.

This is because the bit rates to be processed onboard the satellite require aerospace grade application-specific integrated circuits (ASIC), which have very limited memory capacities. Cells reaching the satellite are present only very briefly, as it were, and, to avoid memory congestion, it is essential to monitor the stream before it is sent by the ground station. Thus, using this solution, it is necessary to verify that the resource is available before sending any data packets.

This implies dedicated equipment on the ground, which is costly.

SUMMARY OF THE INVENTION

An object of the invention is therefore to solve the problem of underuse of the resources of a telecommunications equipment, such as a satellite, in a way that minimizes the impact on the equipment and on the network of which it is a part.

The invention therefore provides a relay for use in telecommunications equipment, said relay comprising:

a receiver adapted to receive an information stream consisting of information cells, some of which can be empty, a mixer adapted to detect the empty information cells and replace them with waiting cells, and a transmitter adapted to transmit the information cells to a receiver outside the telecommunications satellite, which relay is characterized in that it further comprises a stream analyzer for determining if an information stream received by the receiver is a real-time information stream or a differed-time information stream and for storing differed-time information stream cells in a mass memory, and in that the mixer is adapted to choose the waiting cells from among the cells stored in the mass memory.

The invention also provides a method comprising the steps of:

receiving an information stream made up of information cells, some of which can be empty, detecting empty information cells, replacing the empty information cells with waiting cells, and transmitting information cells, which method is characterized in that it further comprises the steps of:

determining if an information stream is a real-time information stream or a differed-time information stream, and storing differed-time information stream cells, and in that the waiting cells are chosen from among the stored information cells.

Thus in the context of an application to a telecommunications satellite, the differed-time streams are stored temporarily in mass memory and replace the empty cells of the real-time streams, with the result that the maximum capacity of the downlink channels is used. The invention therefore significantly improves the performance of the telecommunications satellite.

BRIEF DESCRIPTION OF THE DRAWINGS

The invention and its advantages will be better understood after reading the following description of one embodiment of the invention, which description is given with reference to accompanying drawing.

FIG. 1, already commented on, illustrates the background to the invention.

FIG. 2 shows a telecommunications satellite in accordance with the invention.

FIG. 3 shows a mixer in accordance with the invention.

DESCRIPTION OF EXEMPLARY EMBODIMENTS

FIG. 2 shows a context in which the invention can be deployed. A telecommunications satellite S can receive information streams of different kinds, i.e. real-time information streams $F_{tr}$ and differed-time information streams $F_{diff}$. The information streams are received by a receiver R known in the art. As soon as it receives them, the receiver forwards the received information streams to a stream analyzer A which determines their nature, i.e. whether they are real-time or differed-time streams.

In an embodiment of the invention, each information stream is assigned a different carrier frequency. Consequently, it is a simple matter for the stream analyzer A to determine the nature of the received information stream, simply by reference to its carrier frequency.

It is important to note that the information streams can be of different kinds, for example a data information stream or a signaling information stream.

Following the above analysis, the information streams take different routes, as a function of their nature.

The differed-time information streams $F_{diff}$ are stored in a mass memory MM, whose size can be of the order of approximately 2 megabytes, for example. It can be an aerospace grade mass memory similar to those used in remote sensing satellites.

The real-time information streams are forwarded directly to a mixer M.

The mixer M is adapted to detect empty information cells in the real-time streams forwarded to it. As previously mentioned, the real-time streams may contain empty cells (called "filler" cells) that represent the difference between the bit rate actually needed and the reserved bandwidth.

A link L forwards cells stored in the mass memory MM to the mixer M.

The function of the mixer is to replace the empty information cells that it has detected with information cells received from the mass memory MM via the link L.

FIG. 3 shows in more detail how the mixer M works.

The figure shows a real-time information stream $F_{TR}$ made up of information cells $C_1, C_2, C_3, C_4, C_5, \ldots, C_n$.

A differed-time information stream $F_{diff}$ is stored directly in the mass memory MM. The mass memory contains information cells $P_1, P_2, \ldots, P_m$ belonging to the differed-time stream.

The mixer M receives the two information streams as input and produces as output a new information stream $F_{OUT}$ based on the real-time information stream. Each information cell of the real-time information stream that was empty (not shaded in FIG. 3) is replaced with an information cell previously stored in the mass memory.

Thus the output information stream $F_{OUT}$ is made up of information cells $C_1, P_1$ (since $C_2$ is empty), $C_3, C_4, P_2$ (since $C_5$ is empty), $\ldots, C_n$.

Note that relaying of the real-time information stream is not slowed down at all by this mechanism and that the differed-time information stream is in fact relayed in a manner that is entirely transparent for the relaying of the real-time information stream.

As shown in FIG. 2, the output information stream is then forwarded to a transmitter E which transmits the information cells to a receiver outside the relay satellite itself (typically a ground station, but possibly another telecommunications satellite, as in the case of a constellation of satellites, for example).

In an embodiment of the invention, the mixer M can choose waiting cells as a function of time scheduling rules. Thus it is possible to define a time schedule for each differed-time stream. This time scheduling typically takes the form of a transmission date and time.

Another advantage of the invention is that it is easy to broadcast differed-time information streams to more than one destination. This type of function is known as multicasting.

The information cells corresponding to differed-time information streams are stored in the mass memory MM. The mixer M can then therefore read them several times and the transmitter E can transmit them to multiple destinations.

It is therefore not necessary to transmit the same information cell several times from a ground station to the telecommunications satellite S: the duplication is effected directly in the telecommunications satellite. This represents an important saving in the uplink stream bandwidth.

In a preferred embodiment of the invention, the telecommunications satellite further comprises a deleter D for deleting the information cells stored in the mass memory MM. Its function is to prevent the mass memory from being filled completely.

The deleter D normally deletes a given information cell once the latter has been transmitted to one or more receivers (ground station, other satellite, etc.).

If it is transmitted to a single destination, the information cell is deleted as soon as it has been read the first time by the link L.

The invention claimed is:

1. A relay for use in telecommunications equipment, said relay comprising:
   a receiver adapted to receive an information stream comprising information cells, some of which are empty,
   a transmitter adapted to transmit the information cells to a receiver outside said telecommunications equipment,
   a stream analyzer for determining a real-time information stream and a differed-time information stream included in the received information stream;
   a mass memory to store said differed-time information stream; and
   a mixer coupled to said mass memory and adapted to detect the empty information cells and replace said empty information cells with waiting cells, wherein said waiting cells are selected from said stored differed-time information.

2. The relay according to claim 1, further comprising a deleter to delete an information cell stored in said mass memory when it has been sent by said transmitter to said receiver.

3. The relay according to claim 1, wherein said mixer is adapted to select said waiting cells as a function of time scheduling rules.

4. The relay according to claim 1, wherein said telecommunications equipment comprises a satellite.

5. The relay according to claim 1, wherein said empty information cells are related to a difference between a needed bit rate and a reserved bandwidth.

6. A method comprising:
   receiving an information stream including information cells, wherein some of said information cells are empty information cells;
   detecting said empty information cells in said information stream;
   determining whether said information stream includes real-time information or differed-time information;
   storing the differed-time information as differed-time information cells in a mass memory;
   selecting waiting cells from among the stored differed-time information cells; and
   replacing said empty information cells with said waiting cells for transmission.

7. A relay comprising:
   a first receiver adapted to receive a real-time information stream and a differed- time information stream;
   a stream analyzer for identifying the real-time information stream and the differed-time information stream;
   a memory for storing the differed-time information stream as differed-time cells; and
   a mixer adapted to provide an information stream for transmission to a second receiver, the information stream including the real-time information stream and at least a portion of the differed-time information cells, the mixer to insert the differed-time information cells along with the real-time information stream where the real-time information stream is at less than bandwidth capacity.

8. The relay of claim 7, wherein the mixer is to insert the differed-time information cells where data is absent from the real-time information stream.

9. The method according to claim 8, further comprising deleting a stored information cell when it has been sent.

10. The method according to claim 6, wherein said waiting cells are selected as a function of time scheduling rules.

11. The method according to claim 6, wherein said empty information cells are related to a difference between a needed bit rate and a reserved bandwidth.

12. The relay of claim 7, wherein the mixer is to insert the differed-time information cells during a latency period associated with the real-time information stream.

* * * * *